United States Patent
Chen

(10) Patent No.: US 11,663,614 B2
(45) Date of Patent: *May 30, 2023

(54) REVIEW SYSTEM WITH LOCATION-VERIFIED REVIEWS

(71) Applicant: Philip Ta-te Chen, Redwood City, CA (US)

(72) Inventor: Philip Ta-te Chen, Redwood City, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/325,155

(22) Filed: May 19, 2021

(65) Prior Publication Data

US 2021/0272136 A1    Sep. 2, 2021

Related U.S. Application Data

(63) Continuation of application No. 15/813,168, filed on Nov. 15, 2017, now Pat. No. 11,037,174, which is a continuation of application No. 14/251,514, filed on Apr. 11, 2014, now Pat. No. 9,842,340.

(51) Int. Cl.
   G06Q 30/02      (2023.01)
   G06F 16/22      (2019.01)
   H04W 4/029     (2018.01)

(52) U.S. Cl.
   CPC ......... *G06Q 30/02* (2013.01); *G06F 16/2228* (2019.01); *H04W 4/029* (2018.02)

(58) Field of Classification Search
   None
   See application file for complete search history.

(56) References Cited

U.S. PATENT DOCUMENTS

| | | | |
|---|---|---|---|
| 8,170,958 B1* | 5/2012 | Gremett | G06Q 30/0282 705/347 |
| 8,396,888 B2* | 3/2013 | Cheng | G06F 16/951 707/765 |
| 8,521,128 B1* | 8/2013 | Welsh | H04M 1/72457 455/414.3 |
| 8,667,424 B2* | 3/2014 | MacFarlane | G01C 21/3664 345/173 |
| 8,812,029 B1* | 8/2014 | Cao | H04W 4/023 455/457 |
| 9,146,939 B1* | 9/2015 | Zhdanovich | G06F 16/9535 |
| 9,418,370 B2* | 8/2016 | Jackson | G06Q 30/0203 |
| 2008/0294639 A1* | 11/2008 | Davis | G06Q 10/10 707/999.009 |

(Continued)

*Primary Examiner* — Sunit Pandya

(57) ABSTRACT

In general, the subject matter described in the specification can be embodied in methods, systems and program products for an improved review system with location-verified reviews. The system verifies a user's location using one or more available sources, such as geographic location by global positioning system (GPS), cellular localization systems, or wireless local area network (WLAN). The user confirms the business or attraction at the current geographic location that the user would like to review. The system then accepts a review of the business or attraction at the current geographic location. The review is indexed for retrieval. Preferably, the system includes a delay before indexing a review, wherein the management of the business or attraction is notified of the review so that it can respond to any complaints in the review before it is made available for retrieval.

9 Claims, 4 Drawing Sheets

(56) References Cited

U.S. PATENT DOCUMENTS

| | | | | |
|---|---|---|---|---|
| 2009/0005076 A1* | 1/2009 | Forstall | ................ | H04W 4/029 |
| | | | | 345/173 |
| 2011/0083101 A1* | 4/2011 | Sharon | ................ | H04W 4/029 |
| | | | | 709/204 |
| 2012/0123867 A1* | 5/2012 | Hannan | .............. | G06Q 30/0261 |
| | | | | 705/14.58 |
| 2015/0334137 A1* | 11/2015 | Liu | ........................ | H04L 65/40 |
| | | | | 709/204 |

* cited by examiner

REVIEW SYSTEM WITH LOCATION-VERIFIED REVIEWS

CROSS-REFERENCE TO RELATED APPLICATIONS

This application is a continuation application of U.S. patent application Ser. No. 15/813,168 filed Nov. 15, 2017, which is a continuation of U.S. application Ser. No. 14/251,514 filed Apr. 11, 2014, which has issued as U.S. Pat. No. 9,842,340. The prior applications are incorporated herein by reference in their entirety.

BACKGROUND OF THE INVENTION

The invention relates generally to a review system that uses location-confirmed reviews of businesses and attractions, and allows the reviewed business the opportunity to respond before the review is indexed and available for retrieval.

There exist review systems that store and index reviews of businesses and attractions from users. Patrons of a business or visitors of an attraction may submit a review that provides positive or negative impressions of that business or attraction. These reviews can be submitted contemporaneously at the location or later at home. The review systems store and index these reviews so that future visitors may review the reviews of a business or attraction before visiting.

One such popular review system is run by Yelp, Inc. headquartered in San Francisco, Calif. Through the use of a Yelp software application ("app") running on a mobile handset, a user can submit reviews of businesses or attractions that are indexed and made available on the Yelp website or the Yelp app. Yelp's review system allows the reviewed business to respond to reviews that are indexed and available.

There also exist technologies that allow users to identify their locations using handheld devices and nearby local businesses. For example, the Yelp for iPhone version 4 update in 2010 included functionality that allowed the review system to use the mobile handset's location services to identify businesses in the vicinity of the user's location and allowed the user to "check-in" to a business. Other companies, such as Facebook and Foursquare, also offer web and mobile applications that use the mobile device to identify the user's estimated location and allow the user to "check in" at a business in the vicinity of the estimated location. Systems for determining the businesses or attractions at a user's locale are also taught in publications such as U.S. Pat. No. 8,559,977 by Busch for example.

In conventional systems, a user may submit reviews of a business or attraction through a mobile app running on a handset. However, this review need not be done while the user is present at the reviewed business or attraction, or at a time when management of a business can address a perceived problem. Thus, reviews can be submitted away from the business or attraction without affording management the ability to address complaints. This drawback in conventional systems makes it easier to falsify reviews.

Media sources have addressed the concerns with the reliability of reviews in existing review systems. Recent articles indicate that Yelp itself considers 20% to 25% of submitted reviews to be "suspicious." Further, investigations have revealed that businesses have paid remote reviewers for positive reviews on Yelp. Articles have been written on how to discern paid reviews from authentic reviews.

BRIEF SUMMARY OF THE INVENTION

This document teaches systems, methods and program products for an improved review system. Available review systems allow the user to submit a review of a business or attraction at any time and from any location. There are few, if any, barriers to falsification of the submitted reviews that are then indexed for retrieval. The described improved review system incorporates one or more checks to increase the quality of submitted reviews. The system requires the reviewer to be physically present at the business or attraction in order to review it. The system also preferably incorporates a feature that notifies a reviewed business of a negative review so that it can contact the reviewer to address any complaints before the review is indexed for retrieval.

In general, a review system includes a database for storing and indexing reviews that can be accessed by a plurality of computing devices that can submit and retrieve reviews of businesses and attraction. A review system application is installed on a wireless handset with location services. The handset has a physical or touchscreen keyboard that can be used to interact with the handset and type inputs. When the user desires to review a business or attraction, the system receives current geographic location from the handset's location services. Location services may include currently-available technologies such as global positioning system (GPS), cellular localization systems, or wireless local area network (WLAN). The system then provides the user with a list of businesses and/or attractions that are at the handset's current location or in the immediate vicinity. The user may then select a business or attraction to review, and submit a review from the wireless handset. The system receives the user's selection and review. Location verification serves as a check on the authenticity of the review.

The system then provides the user an option of contacting the management for the business or attraction to address any complaints. Preferably, this option is always provided to the user because reviews may contain complaints even if the overall review rating is neutral or positive. The system records the user's response to this option. If the user refuses the option, then the review is stored and indexed for retrieval. The review will note that the user refused to contact the management to address any complaints. A willingness to discuss complaints with management operates as a further check on the authenticity of the review. Optionally, a second verification of the location is made before the review is accepted and stored.

If the user indicates a desire to contact management, the system prompts the user for contact information such as a cell phone number and any further information. The user may provide further details that would facilitate management locating the user such as "I am in the hotel lobby wearing a blue sweater." The system also delays indexing the review to prevent an incomplete review from being retrieved. The system notifies management of the business or attraction and provides them with the pending review and user contact information. The system provides management with a prompt and waits a preset amount of time, such as five minutes, for management's response on whether it will contact the user to respond to the complaint. The system records management's response or whether management does not respond. If management indicates that it will not respond or the preset time expires, the review is indexed for retrieval with a notation that the reviewer asked for management response and that management either refused or did not respond to the request. The notification to management may be made by commonly-available technologies such as text message, electronic mail or notification through an application. Optionally, the reviewer's contact information can be withheld and provided only after management has indicated that it will respond.

If management indicates that it will respond, then the system further delays indexing the review for another preset time, such as 30 minutes or an hour, to allow management the opportunity to contact the user and respond to the complaint. The system will notify the user that the management has indicated that it will contact the user to respond to the complaint. After a suitable time, the system asks whether the user would like to amend the original review in light of management's action (or inaction). The system stores and indexes the amended review instead of the original review. After a suitable time, the system also prompts management for a reply to the review that explains whether and how the issue was resolved. If a response is received from management, the system preferably notifies the reviewer and allows the reviewer the option to amend the review again. Any submitted management response is indexed with the review.

Other users may then search the improved review system for reviews of businesses or attractions. When an indexed review is retrieved, the review (or amended review) is presented along with the following information: whether the reviewer contacted management of the business or attraction; whether management timely indicated that it would respond; and any management written response to the review.

As such, an improved review system with checks on the authenticity of the indexed reviews is described. A location check ensures that the reviewer is at the reviewed business or attraction and increases the reliability of the review. A notation as to whether the reviewer opted to contact management provides further reliability for reviews with negative comments. The review system also tracks management willingness to respond to complaints, which can be a source of information about the customer service at a business or attraction.

DETAILED DESCRIPTION OF THE INVENTION

Figure 1:
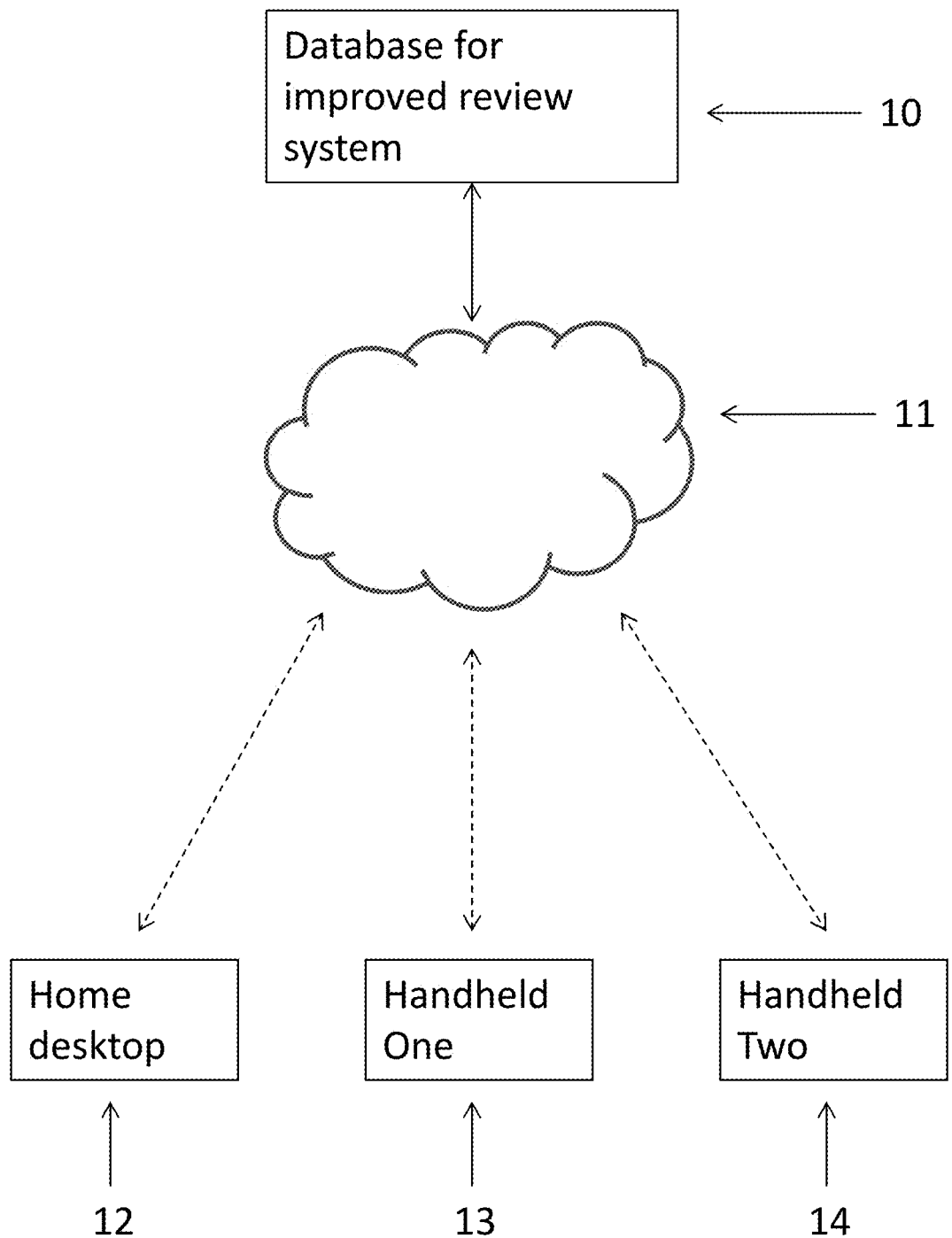
FIG. 1 is a schematic of an improved review system according to the present invention.

Referring to FIG. 1, a schematic of an improved review system according to the present invention is illustrated. The review system is comprised of a database 10 that stores, indexes and retrieves reviews of businesses and attractions. The database is connected to the internet 11 so that it can be accessed by various devices. For example, a user can access the database for the improved review system 10 from a home desktop computer 12 through the internet using an application or website that interacts with the database 10. According to the present invention, the home computer 12 could be used to search for reviews of businesses and attractions but cannot be used to submit reviews because it is not located at a business or attraction. It is contemplated that the home computer 12 may be used to amend or update reviews that were previously submitted at the business or attraction.

The invention contemplates that wireless handheld device one 13 at location one can be used with the improved system. Handheld one 13 includes a physical or touchscreen keyboard that can be used to interact with the handset. The handheld further has location services such as GPS, cellular localization systems, or WLAN. Handheld one 13 connects to the internet through cellular or wireless methods and can retrieve reviews using an application or website that interacts with database 10. According to the present invention, handheld one 13 may also be used to submit reviews for businesses or attractions located at its current location once its geographic location is determined. Handheld one cannot be used to submit reviews for businesses or attractions at locations other than its current location. Likewise, wireless handheld device two 14 can access the database 10 through the internet and can submit reviews for a business or attraction at its current location.

Figure 2:
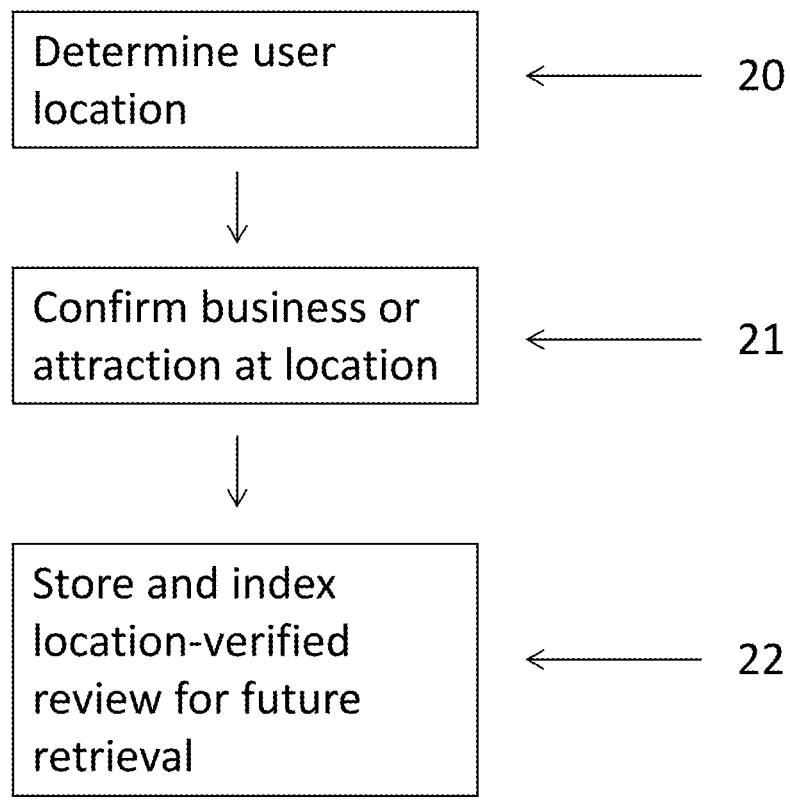
FIG. 2 is one process for intake of a review according to the present invention.

Referring to FIG. 2, intake of a review according to one embodiment of the present invention is illustrated. From a device such as handheld one 13, a user accesses the improved review system through an application or website. In step 20, the system determines the user's geographic location using the handheld's location services. The system identifies businesses and attractions at the user's current location. In step 21, the system presents the user with a list of the businesses and attractions at the user's location or immediate vicinity, and allows the user to confirm the business or attraction the user would like to review. In step 22, the system receives the user's review of the business or attraction, and saves and indexes the submitted review at the database 10.

Figure 3:
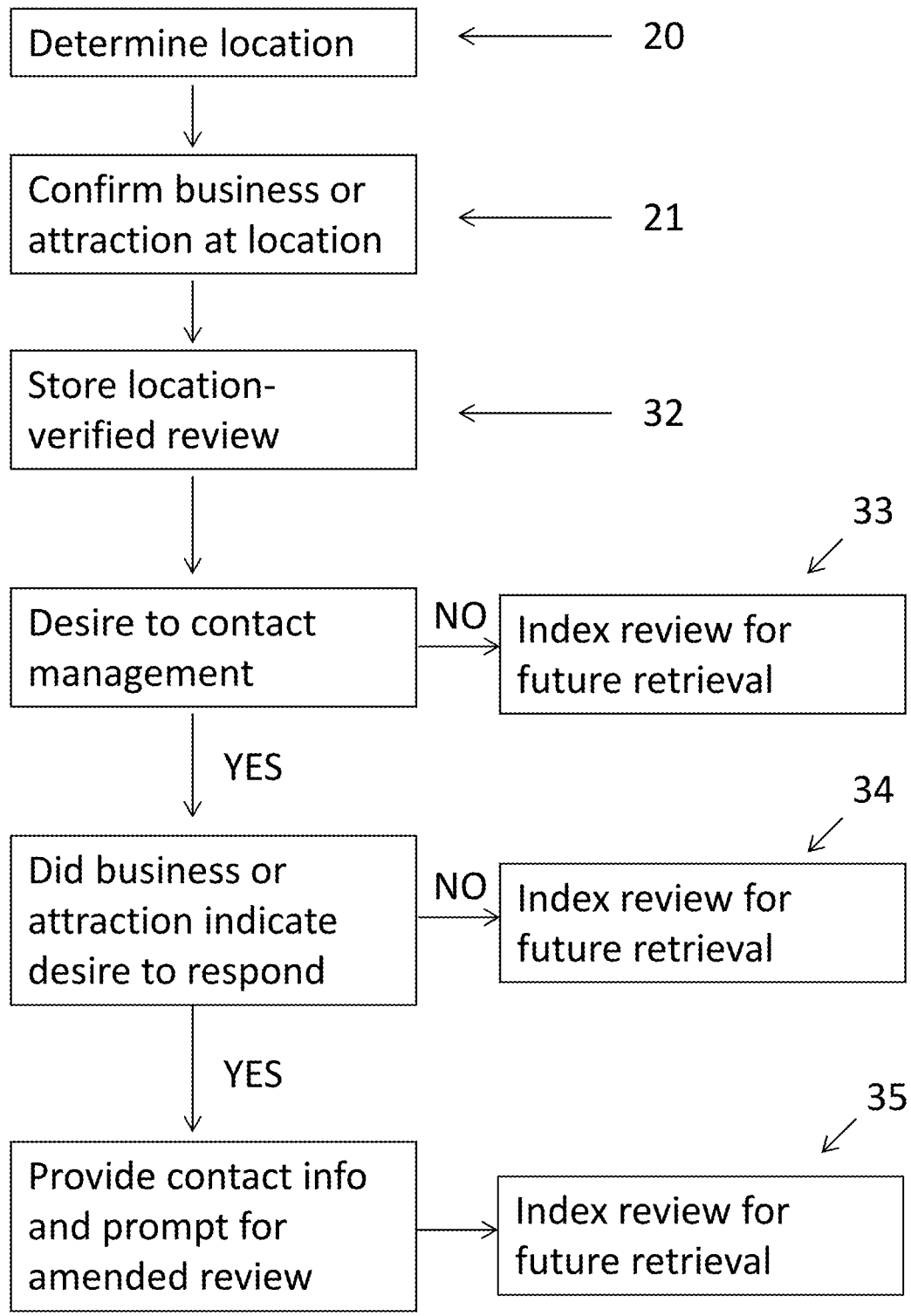
FIG. 3 is an alternative process for intake of a review according to the present invention.

Referring to FIG. 3, intake of a review according to another embodiment of the present invention is illustrated. This embodiment can be employed where management of a business or attraction has indicated that it would like to be notified of complaints in real-time so that it can respond. From a device such as handheld one 13, a user accesses the improved review system through an application or website. In steps 20 and 21, the system determines the user's geographic location and allows the user to confirm the business or attraction. In step 32, the system initially receives and stores the user's review at database 10. However, the review is not indexed for retrieval at this time. In step 33, the system asks whether the user desires to contact management (for example, about a complaint). If the user declines, then the stored review is indexed for retrieval with a notation that the user declined to contact management. If the user indicates a desire to contact management, the system prompts the user to enter contact information. In step 34, the system notifies management of the review and asks whether management would like to respond. If management declines, then the stored review is indexed for retrieval with a notation that the user contacted management but that management declined to respond. The system can preferably treat a failure of management to respond to the notification within a specified period (for example, five minutes) as a decline. If management indicates a willingness to address the review (and any complaints therein), then the system provides the user's contact information in step 35. The system may also notify the reviewer whether management indicated that it will respond, will not respond, or did not respond in time. The system may further ask whether the user wants to amend the review after a period of time (for example, 30 minutes) in light of management action that may have resolve the concerns or complaints. If the user amends the review, the amended review is stored in the review database 10. The amended review may be stored in lieu of the original review. The review (or amended review) is then indexed in the database 10 for retrieval with notations that the user contacted management and management responded. The system may also preferably prompt management to respond to the user review (or amended review) after a period of time. Any management response is stored and indexed with the review for retrieval.

Figure 4:
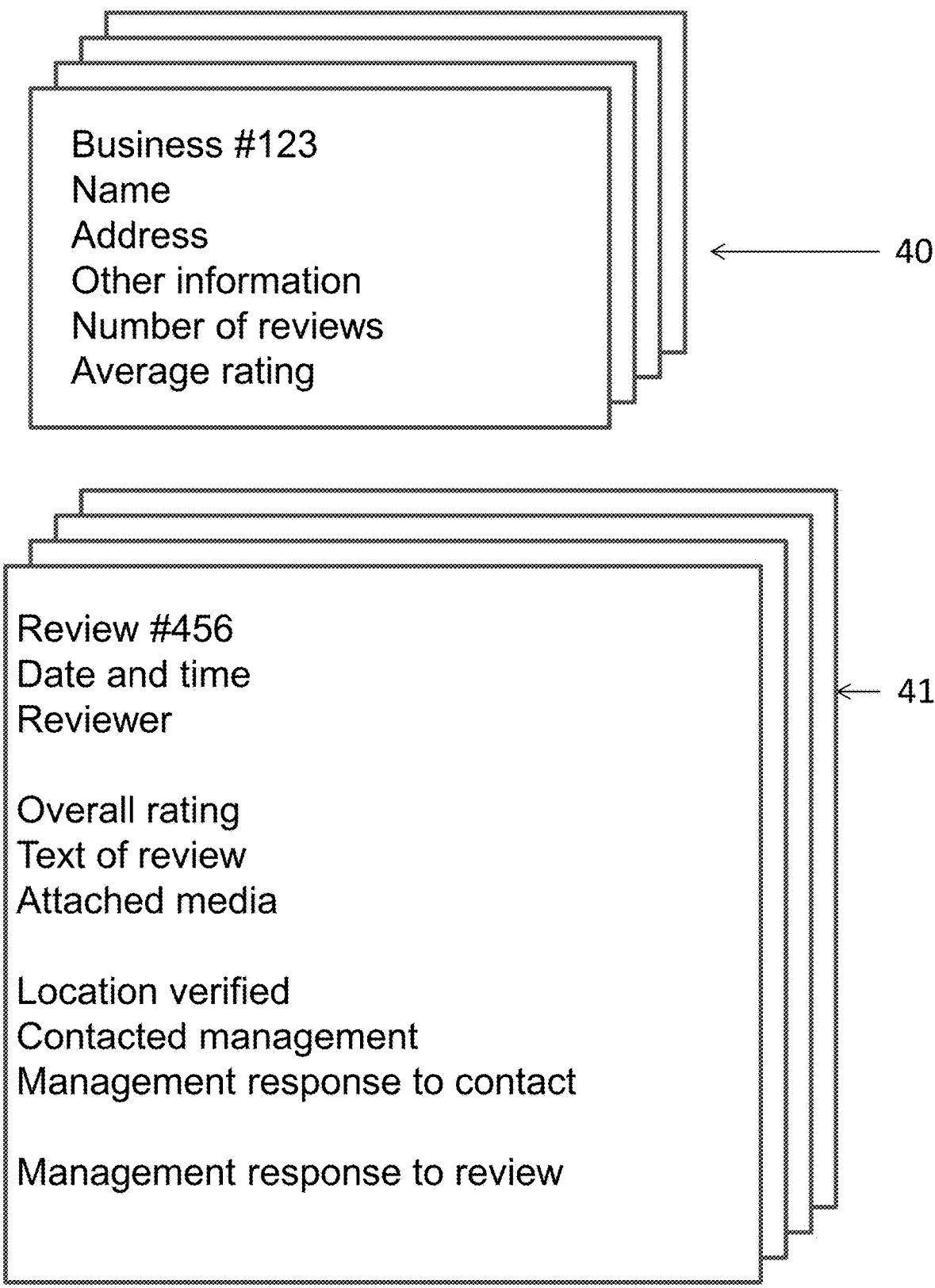
FIG. 4 is an exemplary review entry in the improved review system.

Referring to FIG. 4, database entries within the review database 10 depicted in FIG. 1 are illustrated. An illustrative database entry 40 for Business #123 contains information on the business or attraction. Information stored on entry 40 may include the name of the business; the address of the business; and other information about the business such as the hours of operation or pictures of the business. Information stored on entry 40 also preferably includes the number of submitted and indexed reviews, and the average rating for the business from those reviews. Each business database entry would be associated with the review database entries about the business or attraction. An illustrative database entry 41 for Review #456 contains information about a review for Business #123. Information stored on entry 41 may include the data and time the review was submitted; the reviewer's identification; the overall rating provided for the business or attraction; the text of the review and/or amended review; and any media that the user attached such as pictures of the business or attraction. Information stored on entry 41 also preferably includes notations on whether the review was sent from the geographic location of the business or attraction; whether the reviewer attempted to contact management about the review; and whether management timely responded to the reviewer contact. Entry 41 may also contain any management response to the review or the response may be a separate database entry that is linked to the review.

The foregoing disclosure is exemplary. Modifications and variations will be obvious to one skilled in the art. The foregoing disclosure is intended to enable one skilled to practice the invention and is not limited thereby but is limited only by the spirit and scope of the claims.

The invention claimed is:

1. A computerized method carried out by a processing unit for creating an improved review system, the method comprising:
receiving an unindexed review for a business or attraction from an author using an interface on a handheld device;
transmitting the unindexed review from the handheld device to a first computer system;
storing the unindexed review but not indexing the unindexed review for retrieval at the first computer system;
notifying management of the reviewed business or attraction of the unindexed review on a second computer system;
transmitting the unindexed review to the second computer system;
displaying on the second computer system a first option to contact the author of the unindexed review;
receiving a first selection in response to the first option to contact the author of the unindexed review at the second computer system;
receiving a message from management at the second computer system;
transmitting the message from the second computer system to the first computer system;
notifying the author of the message from management on the handheld device;
transmitting the message from the first computer system to the handheld device;
displaying the message from management on the handheld device;
displaying on the handheld device a second option of amending the unindexed review; and
indexing the unindexed review for retrieval on the first computer system after a period of time following notification to management on the second computer system.

2. The method of claim 1 further comprising:
displaying on the handheld device a third option of communicating with management of the business or attraction subject to the unindexed review;
receiving a third selection in response to the third option on the handheld device;
transmitting contact information of the author to the second computer system; and
displaying the contact information on the second computer system.

3. The method of claim 1 further comprising:
displaying on the second computer system a fourth option to respond to the unindexed review;
receiving a fourth selection in response to the fourth option on the second computer system;
receiving a response to the unindexed review from management of the business or establishment on the second computer system;
transmitting the management response from the second computer system to the first computer system; and
storing and indexing the management response for retrieval with the unindexed review.

4. The method of claim 1 further comprising:
receiving an amended review for the business or attraction from the author using the interface on the handheld device;
transmitting the amended review from the handheld device to the first computer system; and
storing and indexing the amended review at the first computer system such that the amended review will be retrieved instead of the unindexed review.

5. A computer system for an improved review system, the computer system comprising:
a storage device;
a network interface; and
a processor coupled to the storage device and communicably coupled to the network interface, the processor executing software instructions that configure the processor to:
receive an unindexed review for a business or attraction from an author using an interface on a handheld device;
store the unindexed review but not index the unindexed review for retrieval at the computer system;
cause to be notified management of the reviewed business or attraction of the unindexed review on a second computer system;
transmit the unindexed review to the second computer system;
cause to be displayed on the second computer system a first option to contact the author of the unindexed review;

receive a message from management at the second computer system;

cause to be notified the author of the message from management on the handheld device;

transmit the message from the computer system to the handheld;

cause to be displayed the message from management on the handheld device;

cause to be displayed on the handheld device a second option of amending the unindexed review; and index the unindexed review for retrieval on the computer system after a period of time following notification to management on the second computer system.

6. The apparatus of claim 5, wherein the processor is further configured to:

cause to be displayed on the handheld device a third option of communicating with management of the business or attraction subject to the unindexed review;

transmit contact information of the author to the second computer system; and cause to be displayed the contact information on the second computer system.

7. The apparatus of claim 5, wherein the processor is further configured to:

cause to be displayed on the second computer system a fourth option to respond to the unindexed review;

receive the management response from the second computer system; and store and index the management response for retrieval with the unindexed review.

8. The apparatus of claim 5, wherein the processor is further configured to:

receive an amended review for the business or attraction from the author using the interface on the handheld device; and store and index the amended review at the computer system such that the amended review will be retrieved instead of the unindexed review.

9. One or more non-transitory computer-readable media having embodied thereon computer-executable instruction that, when executed, perform a method for creating an improved review system, the method comprising:

receiving an unindexed review for a business or attraction from an author using an interface on a handheld device;

transmitting the unindexed review from the handheld device to a first computer system;

storing the unindexed review but not indexing the unindexed review for retrieval at the first computer system;

notifying management of the reviewed business or attraction of the unindexed review on a second computer system;

transmitting the unindexed review to the second computer system;

displaying on the second computer system a first option to contact the author of the unindexed review;

receiving a first selection in response to the first option to contact the author of the unindexed review at the second computer system;

receiving a message from management at the second computer system;

transmitting the message from the second computer system to the first computer system;

notifying the author of the message from management on the handheld device;

transmitting the message from the first computer system to the handheld device;

displaying the message from management on the handheld device;

displaying on the handheld device a second option of amending the unindexed review; and indexing the unindexed review for retrieval on the first computer system after a period of time following notification to management on the second computer system.

\* \* \* \* \*